US010054159B2

(12) United States Patent
Reichert et al.

(10) Patent No.: US 10,054,159 B2
(45) Date of Patent: Aug. 21, 2018

(54) TENSIONER AND METHOD FOR PRELOADING A BEARING

(71) Applicants: Juergen Reichert, Donnersdorf (DE); Dominik Fritz, Wuerzburg (DE); Hans-Juergen Liesegang, Schortens (DE)

(72) Inventors: Juergen Reichert, Donnersdorf (DE); Dominik Fritz, Wuerzburg (DE); Hans-Juergen Liesegang, Schortens (DE)

(73) Assignee: AKTIEBOLAGET SKF, Gothenburg (SE)

(*) Notice: Subject to any disclaimer, the term of this patent is extended or adjusted under 35 U.S.C. 154(b) by 51 days.

(21) Appl. No.: 15/259,660

(22) Filed: Sep. 8, 2016

(65) Prior Publication Data
US 2017/0074317 A1 Mar. 16, 2017

(30) Foreign Application Priority Data

Sep. 10, 2015 (DE) .................. 10 2015 217 323

(51) Int. Cl.
*F16C 25/06* (2006.01)
*F16C 19/36* (2006.01)
*F16C 25/08* (2006.01)

(52) U.S. Cl.
CPC ............ *F16C 25/06* (2013.01); *F16C 19/364* (2013.01); *F16C 25/08* (2013.01);
(Continued)

(58) Field of Classification Search
CPC ...... F16C 19/364; F16C 19/385; F16C 25/06; F16C 2229/00; F16C 2360/31
See application file for complete search history.

(56) References Cited

U.S. PATENT DOCUMENTS 1,632,495 A * 6/1927 Miller .................. F16C 35/063
384/583
1,669,725 A * 5/1928 Scribner ............... F16C 35/073
384/583
(Continued)

FOREIGN PATENT DOCUMENTS

DE 3914552 A1 11/1989
DE 119946383 A1 4/2001
(Continued)

*Primary Examiner* — Phillip A Johnson
(74) *Attorney, Agent, or Firm* — Bryan Peckjian; SKF USA Inc. Patent Dept.

(57) ABSTRACT

A tensioner for preloading a bearing, the bearing including a first bearing ring and a second bearing ring and being configured to transmit a preload force in a radial direction and/or in an axial direction between the first bearing ring and the second bearing ring, the tensioner including a component coupled to the first bearing ring, a support element for supporting the component relative to the second bearing ring such that a closed force flow arises from the first bearing ring via the component and the support element to the second bearing ring, and a sleeve disposed in an axially displaceable manner between the first bearing ring and the component, the sleeve being configured to change the preload force in response to an axial displacement of the sleeve with respect to the component.

13 Claims, 4 Drawing Sheets

(52) U.S. Cl.
CPC ...... *F16C 2226/60* (2013.01); *F16C 2229/00* (2013.01); *F16C 2240/70* (2013.01); *F16C 2360/31* (2013.01)

(56) References Cited

U.S. PATENT DOCUMENTS 2,018,221 A * 10/1935 Mueller .................. F16C 35/06
384/585
4,336,641 A * 6/1982 Bhatia ..................... F16C 25/06
29/898.09

FOREIGN PATENT DOCUMENTS

| | | | |
|---|---|---|---|
| DE | 102009058355 A1 | 6/2011 | |
| DE | 202012011274 A1 * | 2/2014 | ............. F03D 80/70 |
| JP | S66058957 U | 4/1985 | |
| JP | 2001336606 A * | 12/2001 | ........... F16C 19/364 |
| SU | 1732034 | 5/1992 | |
| WO | 2013152850 A1 | 10/2013 | |
| WO | WO-2013152850 A1 * | 10/2013 | .......... F03D 11/0008 |

\* cited by examiner

TENSIONER AND METHOD FOR PRELOADING A BEARING

CROSS-REFERENCE

This application claims priority to German patent application no. 10 2015 217 323.2 filed on Sep. 10, 2015, the contents of which are fully incorporated herein by reference.

TECHNOLOGICAL FIELD

The present disclosure is directed to the field of tensioners for pretensioning a bearing.

BACKGROUND

In many areas of technology bearings are used that can assume different forms depending on the field of use. For example, there are axial bearings that can prevent movement in the axial direction of a to-be-rotatably-supported component, radial bearings that can prevent a movement of a component in the radial direction, or also bearings that can accommodate combined axial and radial loads. The latter can be mounted pair- or group-wise with further bearings of the same type on a common shaft, for example in order to reduce or even eliminate a clearance of the shaft. For this purpose a preloading can be undertaken by which the clearance is already reduced as much as possible in a rest state of an application. However, many applications, due to their size, can only allow very limited possibilities to undertake the preloading with acceptable effort, since, for example, bearings and shafts supported thereby can have masses of a plurality of tons, which significantly impedes handling. Furthermore, a required precision may possibly not be achieved here, since under certain circumstances even small temperature differences can lead to a non-negligible thermal expansion of bearing components, or there can be the possibility that due to the mass of the bearing which can be for example, over a ton, settlement due to the weight of the bearing or the shaft itself can occur. This can affect, for example, wind turbines, but also other applications wherein bearings are used starting from a predetermined minimum size or minimum mass.

It is therefore desirable to provide an improved concept for a preloading of a bearing.

SUMMARY

According to a first aspect, exemplary embodiments relate to a tensioner for preloading a bearing. The tensioner comprises the bearing, which includes a first bearing ring and a second bearing ring. Here the bearing is configured to transmit a preload force in the radial direction and/or in the axial direction between the first and the second bearing ring. The tensioner also comprises a component coupled to the first bearing ring. In addition, the tensioner comprises a support element for supporting the component against the second bearing ring such that a closed pressure flow arises from the first bearing ring via the component and the support element to the second bearing ring. The tensioner furthermore comprises an axially displaceable sleeve disposed between the first bearing ring and the component. The sleeve is configured to effect a change of the preloading force in the event of an axial displacing of the sleeve with respect to the component. In other words the preloading force can act at any angle between 0° and 90° with respect to the axis of rotation of the bearing. Thus the bearing can be, for example, an angular contact ball bearing or tapered roller bearing. The sleeve can have, for example, an essentially cylindrical shape, and abut with its radially inner-lying or outer-lying wall on a bearing ring. It can thus be made possible to greatly facilitate a setting of a desired preload. In addition it can thus be possible to undertake corrections in a setting of the preload after a final assembly of a system which comprises the tensioner.

In some exemplary embodiments the first bearing ring is an outer ring and the second bearing ring an inner ring. The component comprises a stationary housing. Thus the inner wall of the sleeve can be in abutment with the outer ring of the bearing. In other words, the sleeve can thus be disposed on a stationary component such that the axially displaceable bearing ring is at rest in the operating state. This can allow a changing of the preload force even during operation of the system.

In some exemplary embodiments the sleeve includes a radially extending collar, which is configured to support the first bearing ring in the axial direction. Here the sleeve has an axial gradation (step), which is configured to at least partially enclose a volume with the component so that a buildup of a pressure by a fluid in the volume effects a displacing in the axial direction of the first bearing ring by the sleeve with respect to the component. The volume can thus be limited by the sleeve and the component, but can be accessible here, for example, by fitting joints or a channel. This can open a possibility to integrate a hydraulic sliding seat into the housing.

In some exemplary embodiments the sleeve abuts on the first bearing ring with a contact surface essentially parallel to the axial direction and further includes a conical surface facing away from the contact surface, which conical surface abuts on a countersurface of the component. The conical surface can correspond to a truncated cone that tapers along the axial direction. The preload forces can thereby cause a displacing of the first bearing ring in the radial direction towards the second bearing ring, which can significantly reduce a force required for a prescribed reduction of a clearance between the bearing rings.

In some exemplary embodiments the sleeve and the component delimit an intermediate space for receiving an adjusting element. Here an adjusting element, which is configured to fix an axial position of the sleeve with respect to the component, is introduced in the intermediate space. Thus after a relaxation of a hydraulic or mechanical system, which effects the axial displacing of the sleeve, a fixing of the desired position is possible.

In some exemplary embodiments the intermediate space is a bore extending parallel to the axial direction, which bore completely penetrates the sleeve and continues into the component. Here the adjusting element is a screw. Thus a mechanical system can be provided by whose activation a desired axial position, and thus a desired preload, is easily adjustable and also fixable.

In some exemplary embodiments the bearing has an outer diameter of at least 1500 millimeters. The tensioner can thereby make it possible to reduce settlement effects by a simplified adjusting of the preload, or also to simplify or to avoid a complicated handling of the bearing or of the component during the setting of the preload due to the mass or dimensions.

In some exemplary embodiments the tensioner further comprises a further bearing including an inner ring and an outer ring. The tensioner also comprises a common shaft on which the bearing and the further bearing are disposed. Here a force direction of a preload force of the first bearing on the second bearing ring and a further force direction of a preload force of the outer ring on the inner ring extend away from each other towards the common shaft. In other words, the bearing can describe a so-called back-to-back arrangement, by which a higher support width and thus improved stability of the shaft with respect to torsion movements can be achievable.

Some exemplary embodiments relate to a wind turbine including an above-mentioned tensioner. By a setting of a preload with increased precision in the initial assembly it can thus be possible to reduce a number of maintenance processes possibly necessary later, which, for example, in wind turbines at sea can be associated with increased effort, costs, or weather-related problems.

According to a further aspect exemplary embodiments relate to a method for preloading a bearing. The method comprises a coupling of a component to a first bearing ring of the bearing. In addition, the method comprises a supporting of the component by a support element against a second bearing ring of the bearing such that a closed force flow arises from the first bearing ring via the component and the support element to the second bearing ring. The method also comprises a displacing of a sleeve, which is disposed between the first bearing ring and the component, with respect to the component in the axial direction such that a changing is effected of a preload force, which is transmitted in the radial direction and/or in the axial direction between the first and a second bearing ring of a bearing. A setting of a desired preload can thus be made significantly easier or improved with respect to its accuracy. Here corrections in a setting of the preload can also be undertaken with the tensioner after a final assembly of a system.

Further advantageous designs are described in more detail below with reference to exemplary embodiments depicted in the Figures, but are not limited to said exemplary embodiments.

DETAILED DESCRIPTION

Figure 1:
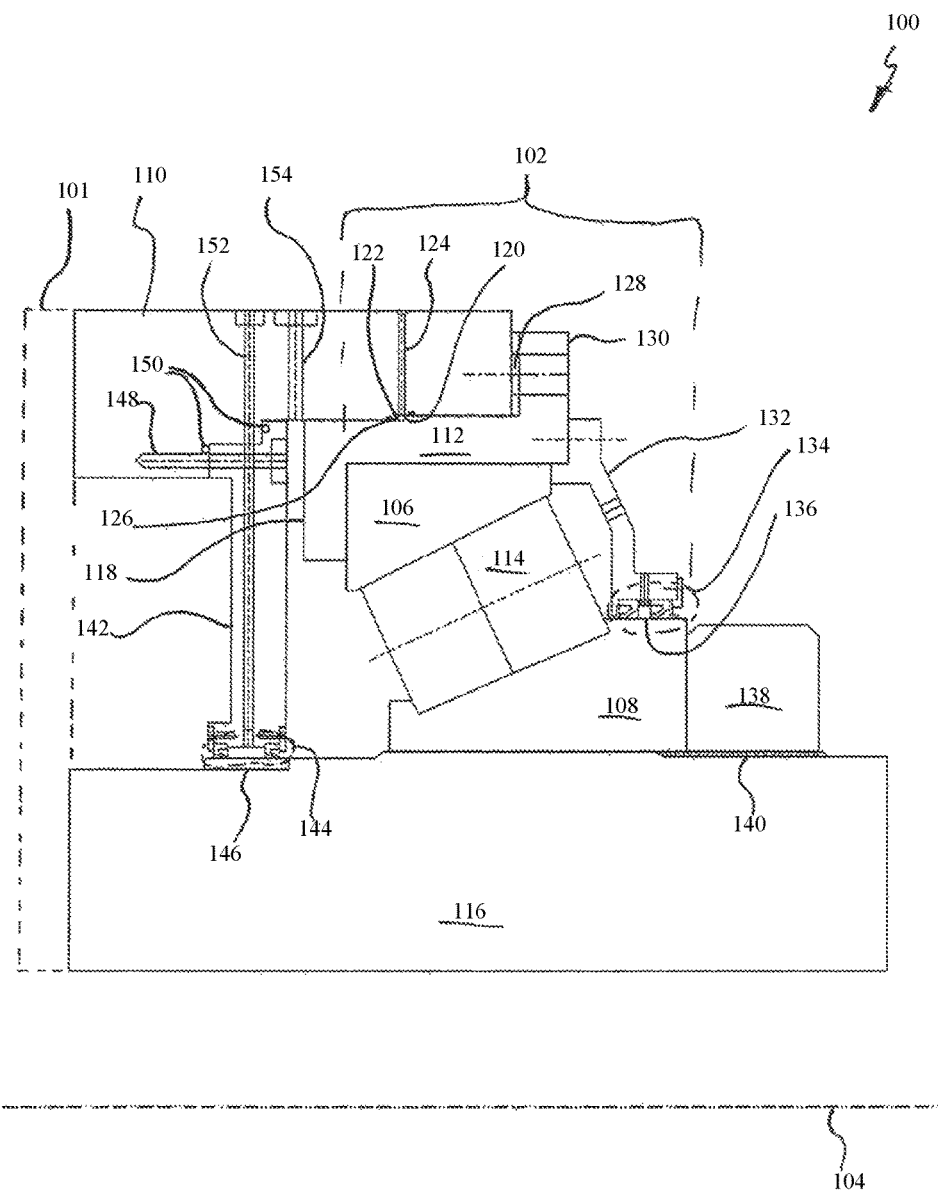
FIG. 1 shows a cross-sectional view of a tensioner for preloading a bearing according to a first exemplary embodiment.

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

A bearing system can comprise, for example, an angular contact ball bearing (ACBB) or tapered roller bearing (TRB) that are installed in back-to-back or face-to-face arrangement. The designations back-to-back and face-to-face arrangement refer to the path of force vectors of supporting- or preloading-forces that are transmitted from an outer ring via rolling elements to an inner ring. In a face-to-face arrangement two force vectors of two different bearings extend towards each other to the central axis, and in back-to-back arrangement away from each other in a corresponding manner. The setting of a preload in such a bearing system can be a complex process and can be accompanied by increased requirements in terms of precision. Here the adjusting can be ever more complex with increasing bearing size. In the application field of primary wind-rotor bearing assemblies it can be necessary, for example, to preload in a targeted manner tapered roller bearings having outer diameters of at least three meters in back-to-back arrangement. Due to the bearing size, conventional adjusting methods, such as are practicable for high-volume installations in the automotive field, for example, via a frictional torque, can possibly no longer be applied. From a technical perspective a partial assembly is required for large bearings of this type. Due to the partial assembly, which can comprise a use of auxiliary sleeves, the actual bearing spacing can be determined. However, tolerance chain calculations can deliver inaccurate values under certain circumstances. With the help of the actual spacing attachments can be modified for the correct adjusting of the preload, which, however, can entail unnecessary effort.

With large bearings (e.g. starting at 5 t mass or starting at 1.5 m outer diameter), assembly or partial assembly can be associated, for example, with an increased time requirement. Here a heating of the bearing rings or of a housing corresponding to a shaft- or housing-seat can be undertaken. With very large bearings a cooling to room temperature can in some cases take more than 24 hours. Due to an influence of thermal expansion effects a waiting for cooling can accordingly be required.

The assembly itself can also run the risk of damaging the rolling-element bearing or its components. With very large bearings the bearing masses can be more than 5 t, or housing- and shaft-masses more than 30 t. A complex handling of the parts or a partial assembly can consequently significantly increase the risk of bearing damage. Due to the inaccessibility inside the assembly or also the risk of carrying out a setting incorrectly, an improvement of an assembly process or of a reproducible setting precision can be desirable.

Methods for a setting of a preload can relate to an axial positioning of the bearing rings with respect to each other. In other words, relative movements of the rings can take place with respect to the shafts and housings, which due to fits can only be detected or adjusted with great difficulty and imprecisely.

Some exemplary embodiments for setting the preload relate to the fact that using a sleeve the setting of the preload can be greatly facilitated. In a first exemplary embodiment this can comprise an axial positioning of the rings, or in a second exemplary embodiment comprise a radial widening of an inner ring or a radial compressing of an outer ring with unchanged axial position of the rings (wherein, for example, axial relative movements can be eliminated). The preload in the bearing system can thus possibly be set more easily. The second exemplary embodiment can be implemented, for example, by suitable fittings. Here the fittings can be variably adjustable.

FIG. 1 shows a tensioner 100 for preloading a bearing 102 according to the first exemplary embodiment in cross-sectional view through a plane wherein the central or rotational axis 104 lies. The tensioner 100 comprises the bearing 102, which includes a first bearing ring 106 and a second bearing ring 108. Here the bearing 102 is configured to transmit a preload force in the radial direction and/or in the axial direction between the first bearing ring 106 and second bearing ring 108. The tensioner 100 also comprises a component 110 coupled to the first bearing ring 106. In addition, the tensioner 100 comprises a support element 101 for supporting the component 110 against the second bearing ring 108 such that a closed force flow arises from the first bearing ring 106 via the component 110 and the support element 101 to the second bearing ring 108. The tensioner 100 further comprises a sleeve 112 axially displaceably disposed between the first bearing ring 106 and the component 110. The sleeve 112 is configured to effect a changing of the preload force in the event of an axial displacement of the sleeve 112 with respect to the component 110.

The bearing 102 can be a bearing that can accommodate combined loads, or in other words, for example, a tapered roller bearing or angular contact ball bearing. Bearings that can accommodate combined loads are configured to prevent movements of a supported shaft relative to a housing in the radial direction and in at least one axial direction. In FIG. 1 the bearing 102 is embodied as a tapered roller bearing with conical rolling elements 114.

The component 110 can be a stationary housing 110 or can comprise such a housing. The stationary housing 110 can be comprised, for example, of a support structure, which is disposed in a nacelle of a wind turbine. Accordingly, as FIG. 1 shows, the first bearing ring 106 can be an outer ring 106, and the second bearing ring 108 can be an inner ring 108. In other exemplary embodiments the component 110 can alternatively comprise a shaft. Accordingly the first bearing ring can be an inner ring, and the second bearing ring 108 can be an outer ring. In the present exemplary embodiment the inner ring 108 is directly connected to a shaft 116, for example, using a press-fit. In other words the inner ring 108 can circulate.

The support component 101 can be configured one-part or multi-part. The support component 101 is also configured to, for example, limit an axial movement of the component 110 toward the support component. Furthermore, the support component 101 can also be connected to the second bearing ring 108 such that an axial relative movement between the component 110 and the second bearing ring 108 is limited or even prevented. Here the closed force flow from the support component 101 to the second bearing ring 108 can occur directly or indirectly, e.g., via the shaft 116. In one exemplary embodiment, which is described in more detail below, the support component 101 is a further bearing. The further bearing can be, for example, a tapered roller bearing.

Due to the circulating inner ring 108, with very large bearings, for example starting from at least 1500 mm outer ring diameter, a tighter inner-ring seat can be chosen (e.g., an S-fit). Due to the comparatively looser fit of the outer ring 106 it can be useful for setting the preload to embody the sleeve 112 in combination with the outer ring 106. The sliding seat between housing 110 and sleeve 112 here can be provided with a transition fit, or in other words an adjustable fit. The seat between outer ring 106 and sleeve 112 can have a tighter fit compered to the seat between housing 110 and sleeve 112.

The sleeve 112 includes a radially extending collar 118 which is configured to support the outer ring 106 in the axial direction. The sleeve 112 also includes an axial gradation 120, which is configured to at least partially enclose a volume 122 with the component 110 so that a buildup of a pressure by a fluid in the volume 122 effects a displacing in the axial direction of the outer ring 106 by the sleeve 112 with respect to the component 110.

The fluid can be, for example, a lubricant, e.g., grease or oil. For introducing the fluid into the volume 122 the housing 110 has a channel 124 that extends from radially outside through the housing 110 to the volume 122. Thus it can be possible to undertake an oil-pressure mounting of the sleeve 112 with the outer ring 106 in a desired axial position. After an introducing of oil (or another lubricant) into the volume 122, an increasing of a pressure of the oil can be effected, which urges it into a joint on the contact surface between sleeve 112 and housing 110 and forms a think film there. This can significantly reduce a friction between sleeve 112 and housing 110 and thus possibly effect an easier displaceability without stick-slip effects.

The volume 122 is delimited radially inward by a surface of the sleeve 112, which surface is parallel to the central axis 104, and radially outward by a surface of the housing 110 into which the channel 124 opens, which surface is parallel to the central axis 104. The axial gradation 120 of the sleeve 112 and a further axial gradation 126 of the housing 110 form two mutually opposing radially extending surfaces that delimit the volume 122 in the axial direction. The pressure of the oil in the volume 122 can now further effect that the forces directed away from each other on these two radially extending surfaces are exerted, which can cause a displacing of the sleeve 112 along the axial direction (in FIG. 1 to the right). Here the outer ring 106 is carried along by the collar 118 of the sleeve 112 and pressed against the rolling element 114, which further transmits the pressing force onto the inner ring 108.

With the setting of the preload a definition of a "zero point" can be useful. The point can be described as the zero point here, for example, wherein a clearance of the bearing rings 106; 108 or also a preload is essentially equal to zero. The zero point can be found by a hydraulic axial positioning of the outer ring 106. For example, with rings having 2 m outer diameter, due to the oil-pressure mounting an axial ring displacement can occur significantly more easily without stick-slip effects. The zero point can be reached as soon as all rolling elements 114 of the bearing 102 exactly flatly contact the inner ring 108 and the outer ring 106. If the zero point is reached, then due to the fact that here all rolling elements 114 are in contact both with the inner ring 108 and the outer ring 106, an increase in stiffness of the bearing can arise. The stiffness increase can be recognizable, for example, by a pressure increase in the hydraulic system. According to one exemplary embodiment the zero point can thus be defined by the pressure increase. Such a zero point definition can be significantly more difficult in conventional preload-adjusting. Due to the gradation 120 of the sleeve 112 in the housing 110 an integration, for example, of an axial cylinder can be possible, which can be used for zero-point determination. Displacements of a bearing ring beyond the zero point can fall in a range below 1 mm, for example, at approximately 10 to 100 μm.

In other words, in the present exemplary embodiment the sleeve 112 forms a hydraulic axial-sleeve cylinder that can be used for an oil-pressure mounting. Thus the preload in the bearing system can be directly set via the hydraulic pressure. Alternatively an external hydraulic system can also be available for this purpose. A fixing of the preload during a relaxing of the hydraulic system can be made possible by appropriate securing devices, for example, screws or flanges. Here the sleeve 112 and the component 110 delimit an intermediate space 128 for receiving an adjusting element. An adjusting element, which is configured to fix an axial position of the sleeve 112 with respect to the component 110, can be introduced in the intermediate space 128. The intermediate space 128 is disposed on a radial extension 130 of the sleeve 112, which overlaps the housing 110 outward in the radial direction. The intermediate space 128 can be configured, for example, as a borehole for receiving an adjusting element in the form of a screw. Additionally or alternatively the intermediate space 128 can be configured in the form of a gap that is delimited axially by the extension 130 and the housing 110 and encircles in the circumferential direction. Accordingly the adjusting element can be a flange or spacer for insertion in the gap. Furthermore, the adjusting element can also comprise a combination of screw and flange or spacer.

In addition to a hydraulic adjusting of the preload, a mechanical axial displacing can be achieved via a corresponding design of the sleeve. Optionally the use of the oil-pressure mounting can support the mechanical adjusting. A mechanical system for adjusting can be realized, for example, by an adjustment screw as adjusting element, and the intermediate space 128 can be configured as a borehole including an internal thread, which completely penetrates the extension 130 and at least partially penetrates the housing 110 in the continued direction. A turning of the adjustment screw can thus effect or support a displacing of the sleeve 112 with respect to the housing 110. Furthermore, alternatively or additionally electrical or electromechanical systems can be implemented for an axial displacing.

A seal ring 132 is furthermore attached to the extension 128 of the sleeve 112, which seal ring is drawn radially inward and includes a plurality of lip seals 134. The plurality of lip seals 134 seal against a raceway 136 of the inner ring 108. Here the seal lips of some lip seals of the plurality of lip seals 134 point towards rolling elements 114 of the bearing 102, and a seal lip of another lip seal of the plurality of lip seals 134 points away from the rolling elements 114. The inner ring 108 can be secured against slipping in its axial position by a locking element 138 attached to the shaft 116, e.g., a flange or a counter nut. For this purpose the shaft 116 can include a thread or a profiling 140 in order to prevent a slippage of the locking element 138.

In addition, the housing 110 can comprise a carrier element 142, which carries a further plurality of lip seals 144 that seal against a sliding surface 146 of the shaft 116. The sliding surface 146 can be manufactured from a different material than the shaft 116. The lips of the further plurality of lip seals 144 here can be oriented in the axial direction towards the bearing 102. Optionally the housing 110 can also include a bore 148 for attaching the carrier element 142, as well as a plurality of O-rings 150, for example for sealing against leakages. The housing 110 can optionally furthermore include a first leakage channel 152 that opens between two lip seals of the further plurality of lip seals 144, as well as a second leakage channel 154 that opens between the bearing 102 and the carrier element 142. The leakage channels 152; 154 can serve for a discharging of possibly penetrated fluid, for example, water or contaminants, or also for an introduction of sensors for detecting leakage or contaminants, or a measuring of lubricant available for the bearing 102.

The exemplary embodiments described can be used both for an initial assembly (possibly as a preassembled bearing unit) and for readjustment of the preload in operation. A readjustment in operation can, for example, compensate for settlement, wear, and creep. In a conventional adjustment without possibility of readjustment it can be required to make estimates for settlement, etc., and take these into account in the original preload. A system adjusted in the conventional manner can accordingly have a higher preload than required so that even after long periods of time, for example, up to 20 years or more, the preload does not fall below a minimum. However, a higher than required preload can detrimentally affect the performance of a bearing.

Figure 2:
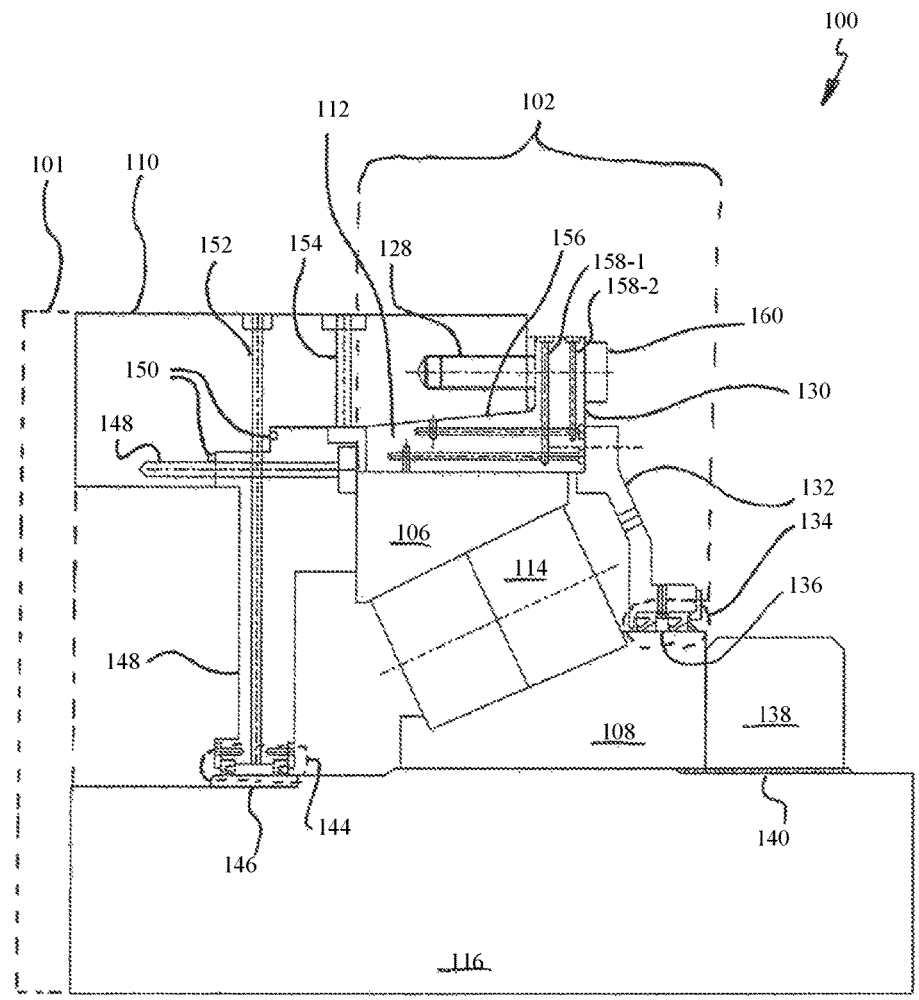
FIG. 2 shows a cross-sectional view of a tensioner for preloading a bearing according to a second exemplary embodiment.

FIG. 2 describes a second exemplary embodiment of the tensioner 100 for preloading a bearing 102 in cross-sectional view through a plane wherein the rotational axis 104 lies. Identical or comparable components that have a counterpart in FIG. 1, bear the same reference numbers herein and are not explained again below. Rather, only the differences are discussed.

In the second exemplary embodiment the sleeve 112 abuts on the inner ring 108 with a contact surface essentially parallel to the axial direction. In other words, the contact surface follows the course of a cylinder whose central axis is parallel or equal to the rotational axis 104 of the shaft 116. Furthermore, the sleeve 112 includes a conical surface 156 facing away from the contact surface, which conical surface 156 abuts on a counter surface of the component 110. The conical surface 156 follows the course of a cone whose central axis is parallel or equal to the rotational axis 104 of the shaft 116 and tapers along the axial direction towards the left in FIG. 2. The component 110 or housing 110 can have a conical countersurface, which is tapered to the same extent as the conical surface 156 or can be connected to an additional sleeve, which includes said countersurface.

The outer ring 106 can be axially in abutment with the housing 110, or more precisely the carrier element 142, whereby an axial displacing of the outer ring 106 can be prevented. With an axially fixed outer ring 106 (or also inner ring 108) the preloading of the bearing 102 can occur by an adapting of the fit between housing 110 and outer ring 106 (or also alternatively between shaft 116 and inner ring 108) via the sleeve 112. In terms of manufacturing technology it could also be possible to realize the cone between sleeve 112 and outer ring 106 or inner ring 108. In the manufacturing of bearings a precision required therefor can be easily achieved. Furthermore a housing processing can greatly facilitated by a cylindrical seat.

Through lubricant channels 158-1; 158-2 a lubricant, e.g., oil is applied by a press-in operation onto the contact surface between outer ring 106 and sleeve 112 and on the conical surface 156 between sleeve 112 and housing 110. A friction can thereby be reduced, and the sleeve 112 axially moved relative to the housing 110 and outer ring 106. During movement of the sleeve 112 towards the carrier element 142 a displacing, or in other words a compression of the outer ring 106 in the radial direction or even exclusively inward in the radial direction can occur. A clamping force can thereby be increased.

The displacing can be effected by an adjusting element 160 embodied in FIG. 2 as adjustment screw 160, which is introduced in the intermediate space 128. The intermediate space 128 can accordingly be a female thread. The female thread extends parallel to the central axis 104, completely penetrates the sleeve 112, and continues into the housing 110 as a blind hole with thread. The adjustment screw 160 can also serve for fixing the sleeve 112 in its axial position during or after a discharge of the lubricant out of the corresponding fitting joints.

Due to the possibly high overlaps on the inner ring 108 and with respect to the higher component-side shaft-inner-ring load an adjusting via the outer ring 106 can be desirable. This can have the result that no tensile stress (such as in an inner ring 108 due to its expansion by a conical sleeve 112 located between inner ring 108 and shaft 116) is applied in the ring, which could possibly have a an effect of shortening the bearing service life. In contrast, a compressing of the outer ring 106 can lead to compression stresses in the outer ring 106, which can possibly have a service-life neutral or even service-life extending effect.

The zero-point position can be chosen as the starting point for a radial preload adjustment. Here the zero-point determination is effected, for example, in an analogous manner to the first exemplary embodiment. The conical sleeve 112 on the outer ring 106 (or also on the inner ring 108) can strengthen or reduce the bearing seat by an axial positioning and thus make possible an adjusting of the preload. The axial displacing can occur in an analogous manner to the first exemplary embodiment by hydraulic, or alternatively or additionally, mechanical, electrical, or electromechanical systems. This can also comprise a hydraulic lifting, whereby stick-slip effects can be avoided. A mechanical securing of the preload force can occur here.

The preload can, for example, result in a displacing of the bearing rings with respect to each other in the range of 0.1 mm to 1 mm. For an exemplary tapered-roller-bearing assembly with 18° pressure angles a necessarily tighter outer-ring seat of approximately 320 μm results in a pressure-angle dependent manner for an axial preload of 500 μm, which outer-ring seat can be applied, for example, by a sleeve-taper angle of 1:30. A pressure load over a circumference of the outer ring 106 (hoop stress) here can be up to 5 MPa.

In order to apply a system preload of 1000 kN, in the first exemplary embodiment under certain circumstances mechanical or hydraulic forces of at least 1000 kN can be required. In order to apply a system preload of 1000 kN, in the second exemplary embodiment with a conical sleeve 112 that has cone gradient of 1:30, under certain circumstances a displacement path of approximately 10 mm (rigid) can be necessary. Due to the cone angle 1:30 a force reduction by a factor of, for example, up to 10 can result, or, in other words, a remaining force expenditure of only 100 kN.

In the second exemplary embodiment a bearing-ring axial displacement, which could be additionally problematic with an inner-ring seat, can be avoided. With a correspondingly conical sleeve a setting of the preload by exerting a radial force can reduce the required preload force approximately by a factor of 10. Production- or handling complexity can be simplified here. A reduced preload force can in turn make possible a simpler integration of a hydraulic cylinder into the sleeve. For example, a sleeve taper of 1:30 corresponds to a cone angle of approximately 2°. Thus it can be prevented by self-locking that the cone pushes out again by itself. A more simply embodied mechanical securing can thereby be sufficient, and there can be the possibility to undertake a simplified implementation of the mechanical securing. In addition, a path-dependent adjusting can be more simply implementable due to large displacement paths (5 to 10 mm).

The described first and second exemplary embodiment, as well as further exemplary embodiments, can open the possibility of a simple integration of hydraulic, electrical, or mechanical displacement seats in the sleeve 112. A preload securing or an oil-pressure mounting aid can also be integrable into the sleeve 112. Furthermore, in exemplary embodiments a readjusting in operation can be possible in a simple manner, since the outer ring 106 has a better accessibility than the inner ring 108. A releasing of a rotor bearing for the readjusting, for example, when used in combination with a wind turbine or a (partial) disassembly of the driveline may possibly be omitted here. If arrangements of a plurality of bearings are used, a division here of the preload adjustment to one or also to at least two bearings can be possible. An influence on all-around loads can be negligible here.

Figure 3:
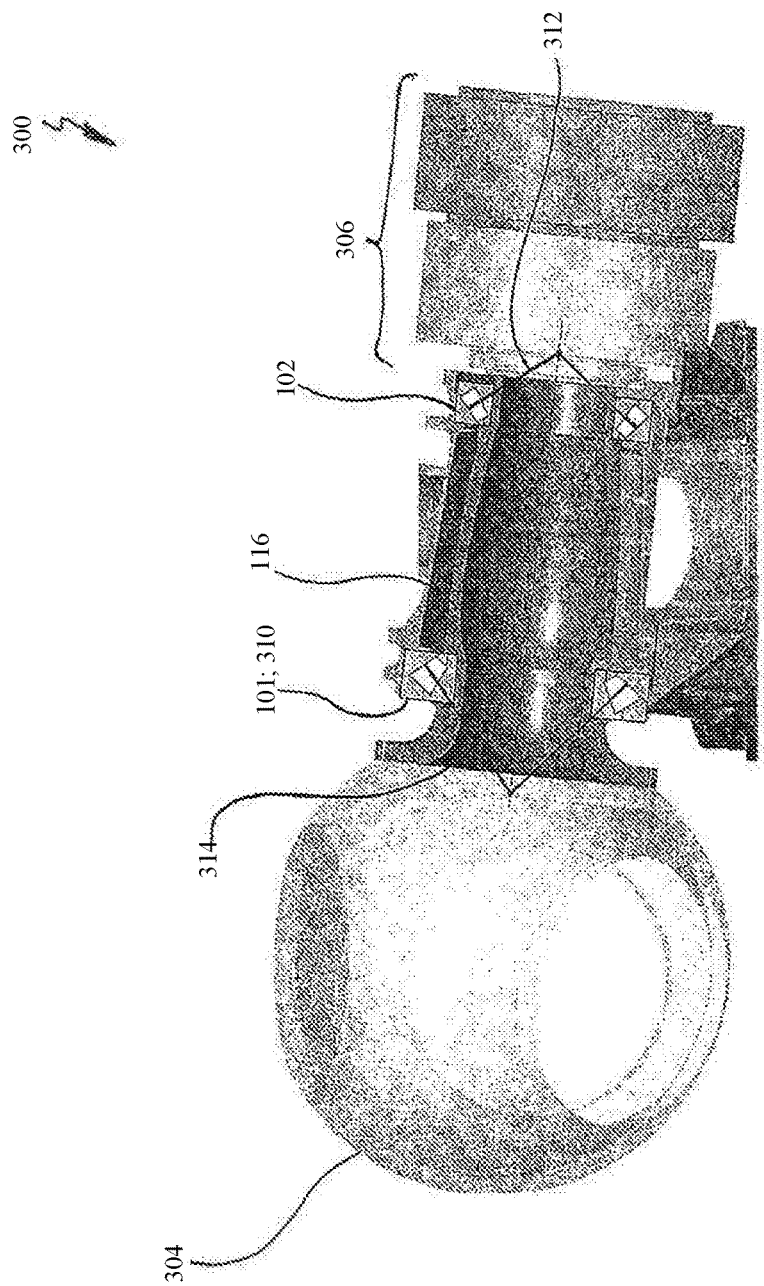
FIG. 3 shows an exemplary application for a tensioner for preloading a bearing in a wind turbine.

FIG. 3 shows a possible application area for a tensioner for preloading a bearing in a wind turbine. In some exemplary embodiments the wind turbine can thus comprise the tensioner. A driveline 300 of the wind turbine comprises a shaft 116 on whose end a hub 304 is mounted, which is configured to carry a plurality of turbine blades. At a counter-end of the shaft 116 further attachments 306 are located, which can comprise, for example, a transmission, a brake, a generator for electricity generation or a stabilizing counterweight to a turbine or a rotor of the wind turbine.

The tensioner can be attached to a bearing 102 and a further bearing 310 with an inner ring and an outer ring, or comprise these. The further bearing 310 can, for example, be identical in construction to the bearing embodied as an angular-contact-ball- or tapered-roller-bearing. Here the shaft 116 is a common shaft 116 on which the bearing 102 and the further bearing 310 are disposed. A force direction 312 of a preload force of the first bearing on the second bearing ring and a further force direction 314 of a preload force of the outer ring on the inner ring extend away from each other towards the common shaft. In other words, the bearing 102 and the further bearing 310 can be mounted in back-to-back arrangement. This can effect a higher support force of the shaft 116, since the two intersection points of the force lines lie farther away from each other than in a face-to-face arrangement wherein the force lines extend towards each other.

As already explained in connection with FIG. 1, the further bearing 310 can correspond to the support element 101 or be comprised by the support element 101. However, the positioning of the bearing 102 and 310 are not limited here to the exemplary arrangement shown in FIG. 3, but can also occur in reverse order. In other words, the tensioner described in FIGS. 1 and 2 can comprise the bearing facing the hub 304, or the bearing facing away from the hub 304. The bearing 102 facing away from the hub 304 in FIG. 3 can possibly offer an easier access due to its positioning that faces an interior of a nacelle of the wind turbine. A preloading of the bearing 102 using the tensioner comprising the bearing 102 could thus be simplified.

A displacing of the sleeve 112 in the axial direction (compare FIGS. 1 and 2) can effect a displacing of the outer ring of the bearing 102 and of the outer ring of the bearing 310 towards each other or away from each other. In other words, it can thus be made possible to preload the bearing 102 and the further bearing 310 using a common tensioner that only comprises one of the bearings 102 or 310. The closed force flow can thus, for example, act from the outer ring of the bearing 102 via the component, the outer ring of the bearing 310, the inner ring of the bearing 310, and the shaft 116 to the inner ring of the bearing 102, also indirectly via respective rolling elements. The preload force or a change of the preload force using the common tensioner can thus be distributed between the bearing rings of the bearing 102 and the bearing rings of the bearing 310. In a further exemplary embodiment the bearing 102 can even by comprised by the tensioner, and the further bearing 310 by a further clamping device.

The respective outer rings of the bearing 102; 310 carry a housing integrated, for example, in the nacelle of the wind turbine. The above-described sleeves 112 according to exemplary embodiments (compare FIGS. 1 and 2) can be used, for example, between the outer rings and the housing. The bearing 102 and/or the further bearing 310 can have an outer diameter here of at least 1500 mm. In other exemplary embodiments the outer diameter of the bearing 102 or of the further bearing 310 can also be at least 1000 mm or at least 2000 mm.

Figure 4:
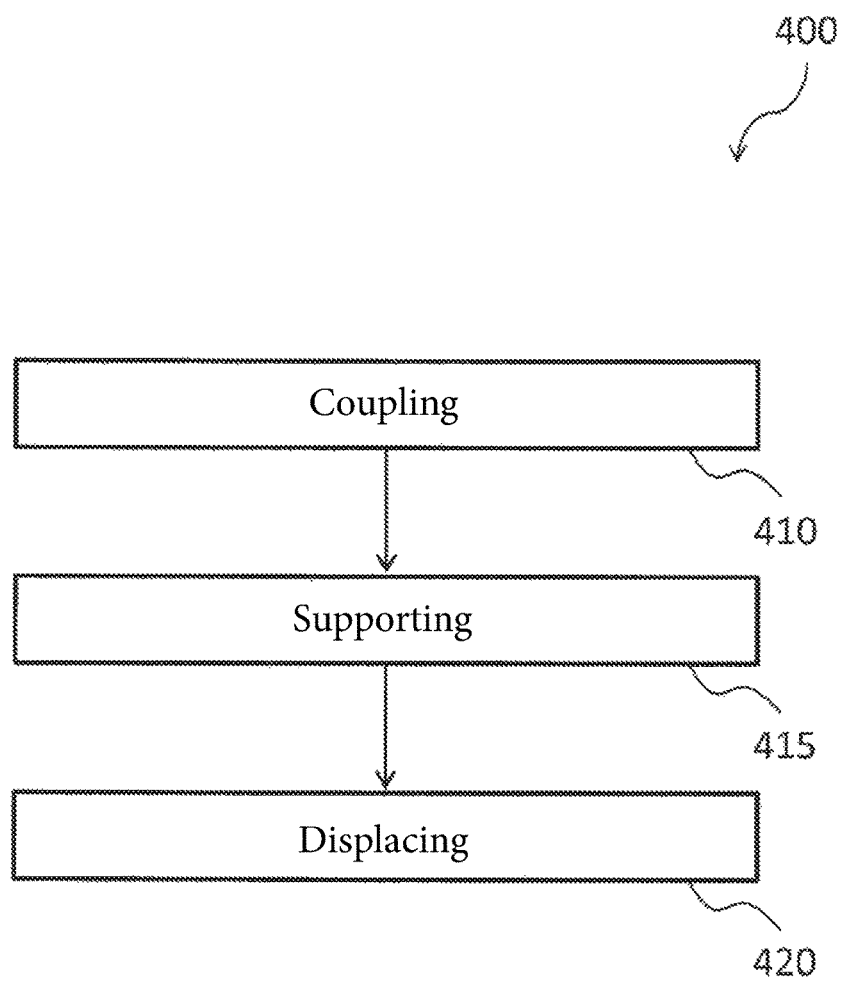
FIG. 4 shows a flow diagram of a method for preloading a bearing according to an exemplary embodiment.

According to a further aspect, and with reference to FIG. 4, exemplary embodiments relate to a method 400 for preloading a bearing. The method 400 comprises a coupling 410 of a component to a first bearing ring of the bearing. The method 400 also comprises a supporting 415 of the component using a support element against a second bearing ring such that a closed force flow arises from the first bearing ring via the component and the support element to the second bearing ring. The method 400 also comprises a displacing 420 of a sleeve, which is disposed between the first bearing ring and the component, with respect to the component in the axial direction such that a changing of a preload force, which is transmitted in the radial direction and/or in the axial direction between the first and a second bearing ring of a bearing, is effected.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

The features disclosed in the foregoing description, the following claims, and the accompanying Figures can be meaningful and can be implemented both individually as well as in any combination for the realization of an exemplary embodiment in its various designs.

REFERENCE NUMBER LIST

100 Tensioner
101 Support element
102 Bearing
104 Rotational axis/central axis
106 First bearing ring
108 Second bearing ring
110 Component
112 Sleeve
114 Rolling element
116 Shaft
118 Collar
120 Axial gradation
122 Volume
124 Channel
126 Further axial gradation
128 Intermediate space
130 Extension
132 Seal ring
134 Plurality of lip seals
136 Raceway
138 Locking element
140 Threads/profiling
142 Carrier element
144 Further plurality of lip seals
146 Sliding surface
148 Bore
150 O-rings
152 First leakage channel
154 Second leakage channel
156 Conical surface
158-1; 158-2 Lubricant channels
160 Adjusting element
300 Driveline
304 Hub
306 Further attachments
310 Further bearing
312 Force direction
314 Further force direction
400 Method
410 Coupling
420 Displacing

What is claimed is:

1. A tensioner for preloading a bearing, the bearing including a first bearing ring and a second bearing ring and being configured to transmit a preload force in a radial direction and/or in an axial direction between the first bearing ring and the second bearing ring, the tensioner comprising:
   a component coupled to the first bearing ring;
   a support element for supporting the component relative to the second bearing ring such that a closed force flow arises from the first bearing ring via the component and the support element to the second bearing ring; and
   a sleeve disposed in an axially displaceable manner between the first bearing ring and the component, the sleeve being configured to change the preload force in response to an axial displacement of the sleeve with respect to the component; and
   wherein the sleeve includes a radially extending collar in contact with an axial face of the first bearing ring, and wherein the sleeve includes an axial gradation configured to at least partially define, with the component, a volume such that a buildup of a pressure by a fluid in the volume displaces the sleeve and the first bearing ring in the axial direction relative to the component.

2. The tensioner according to claim 1, wherein the first bearing ring is an outer ring and the second bearing ring is an inner ring, and wherein the component comprises a stationary housing.

3. The tensioner according to claim 1, wherein the sleeve abuts on the first bearing ring with a contact surface substantially parallel to the axial direction, and the sleeve further includes a conical surface facing away from the contact surface, the conical surface abutting on a counter-surface of the component.

4. The tensioner according to claim 1, wherein the sleeve and the component delimit an intermediate space for receiving an adjusting element, and wherein the adjusting element is introduced in the intermediate space and is configured to fix an axial position of the sleeve with respect to the component.

5. The tensioner according to claim 4, wherein the intermediate space is a bore extending parallel to the axial direction, the bore completely penetrating the sleeve and being aligned with a bore in the component, and wherein the adjusting element is a screw.

6. The tensioner according to claim 1, wherein the bearing has an outer diameter of at least 1500 millimeters.

7. The tensioner according to claim 1, further comprising:
   a second bearing including an inner ring and an outer ring; and
   a common shaft on which the bearing and the second bearing are disposed,
   wherein a force direction of the preload force of the first bearing ring on the second bearing ring and a further force direction of a preload force of the outer ring on the inner ring extend away from each other and towards the common shaft.

8. A wind turbine including a tensioner according to claim 1.

9. A tensioner for preloading a bearing, the bearing including a first bearing ring and a second bearing ring and being configured to transmit a preload force in a radial direction and/or in an axial direction between the first bearing ring and the second bearing ring, the tensioner comprising:
a component coupled to the first bearing ring;
a support element for supporting the component relative to the second bearing ring such that a closed force flow arises from the first bearing ring via the component and the support element to the second bearing ring; and
a sleeve disposed in an axially displaceable manner between the first bearing ring and the component, the sleeve being configured to change the preload force in response to an axial displacement of the sleeve with respect to the component; and
wherein the first bearing ring is an outer ring and the second bearing ring is an inner ring, and wherein the component comprises a stationary housing,
wherein the sleeve includes a radially extending collar in contact with an axial face of the first bearing ring, and wherein the sleeve includes an axial gradation configured to at least partially define, with the component, a volume such that a buildup of a pressure by a fluid in the volume displaces the sleeve and the first bearing ring in the axial direction relative to the component,
wherein the sleeve and the component delimit an intermediate space for receiving an adjusting element, and wherein the adjusting element is introduced in the intermediate space and is configured to fix an axial position of the sleeve with respect to the component,
wherein the intermediate space is a bore extending parallel to the axial direction, the bore completely penetrating the sleeve and being aligned with a bore in the component, and wherein the adjusting element is a screw, and
wherein the bearing has an outer diameter of at least 1500 millimeters.

10. A tensioner for preloading a bearing, the bearing including an outer bearing ring and an inner bearing ring and being configured to transmit a preload force in a radial direction and in an axial direction between the outer bearing ring and the inner bearing ring, the tensioner comprising:
a component coupled to the first bearing ring;
a support element for supporting the component relative to the second bearing ring;
axially displaceable means for changing the preload force;
wherein the axially displaceable means comprises a sleeve mounted on the outer bearing ring; and
wherein the sleeve includes a radially extending collar in contact with an axial face of the first bearing ring, and an axial gradation configured to at least partially define, with the component, a volume such that a buildup of a pressure by a fluid in the volume displaces the sleeve and the first bearing ring in the axial direction relative to the component.

11. The tensioner according to claim 10, including a fixing means for fixing the sleeve relative to the component.

12. The tensioner according to claim 10, wherein the sleeve abuts on the first bearing ring with a contact surface substantially parallel to the axial direction, and the sleeve further includes a conical surface facing away from the contact surface, the conical surface abutting on the component.

13. The tensioner according to claim 10, wherein the bearing has an outer diameter of at least 1500 millimeters.

* * * * *